US 9,543,646 B2

(12) United States Patent
Yoshida et al.

(10) Patent No.: US 9,543,646 B2
(45) Date of Patent: Jan. 10, 2017

(54) ANTENNA CONTROL DEVICE AND ANTENNA APPARATUS (71) Applicant: MITSUBISHI ELECTRIC CORPORATION, Chiyoda-ku (JP)

(72) Inventors: Koji Yoshida, Chiyoda-ku (JP); Naoya Uego, Chiyoda-ku (JP); Yuji Sakai, Chiyoda-ku (JP); Masanobu Horimoto, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/111,103

(22) PCT Filed: Jan. 15, 2015

(86) PCT No.: PCT/JP2015/050876
§ 371 (c)(1),
(2) Date: Jul. 12, 2016

(87) PCT Pub. No.: WO2015/108095
PCT Pub. Date: Jul. 23, 2015

(65) Prior Publication Data
US 2016/0336652 A1 Nov. 17, 2016

(30) Foreign Application Priority Data
Jan. 17, 2014 (JP) .................................. 2014-006482

(51) Int. Cl.
*H01Q 3/08* (2006.01)
*H01Q 1/12* (2006.01)

(52) U.S. Cl.
CPC .............. *H01Q 3/08* (2013.01); *H01Q 1/1257* (2013.01); *H01Q 1/1264* (2013.01)

(58) Field of Classification Search
None
See application file for complete search history.

(56) References Cited

U.S. PATENT DOCUMENTS 4,994,815 A * 2/1991 Nakayama ............... H01Q 3/08
343/765
5,517,204 A 5/1996 Murakoshi et al.

FOREIGN PATENT DOCUMENTS

| JP | 6-104621 A | 4/1994 |
| JP | 7-202541 A | 8/1995 |
| JP | 2001-237629 A | 8/2001 |

OTHER PUBLICATIONS

International Search Report Issued Apr. 7, 2015, in PCT/JP2015/050876 Filed Jan. 15, 2015.

* cited by examiner

*Primary Examiner* — Robert Karacsony
(74) *Attorney, Agent, or Firm* — Oblon, McClelland, Maier & Neustadt, L.L.P.

(57) ABSTRACT

An antenna control device includes a direction acquirer to acquire a target direction in which a target object to be tracked exists, a coordinate converter to perform conversion into an Y-coordinate which is an angle between the target direction and a plane containing both the zenith direction and a Y-axis fixed horizontally within a rotation range of the vertical axis, and into a X-coordinate which is an angle between the zenith direction and a projection of the target direction projected onto the plane. A drive command value arithmetic processor commands a vertical axis angle value obtained by multiplying the Y-coordinate by a coefficient. The arithmetic processor calculates the command value for each of the horizontal axis and the cross horizontal axis such that difference between the pointing direction of the antenna and the target direction is less than or equal to an allowable value.

8 Claims, 9 Drawing Sheets

ANTENNA CONTROL DEVICE AND ANTENNA APPARATUS

TECHNICAL FIELD

The present disclosure relates to an antenna control device for controlling a pointing direction of an antenna that performs communication while tracking a target object, and relates to an antenna apparatus.

BACKGROUND ART

Conventional satellite tracking has been performed through control of a drive axis to direct a beam of the antenna toward a satellite using a pre-obtained forecast value of satellite orbit. As a technique for controlling the attitude of an antenna (ground antenna) of a satellite communication earth station, an azimuth-elevation (AZ/EL) mount may be used for supporting rotation around a vertical axis (AZ axis) and a horizontal axis (EL axis).

In the case of an AZ/EL mount, sometimes it is necessary to rotate the mount instantly around the AZ axis by 180° when the target object passes the zenith. This is commonly referred to as gimbal lock. Patent Literature 1 describes an antenna apparatus that does not experience gimbal lock. The antenna apparatus in Patent Literature 1 performs switching so that when a beam direction of an antenna is less than or equal to a set elevation angle, inputs are given to drive inputs of two axes among a vertical axis, a horizontal axis, and a cross horizontal axis that are individually driven, whereas when the beam direction of the antenna is greater than or equal to the set elevation angle, inputs are given to drive inputs of all of the three axes. Also, after the switching to the three-axis driving, a value for each specific axis obtained by calculating the present values of the three axes is provided to the drive input of each specific axis of the three axes.

Also, when AZ/EL coordinates are used in an interpolation process while the satellite is in a position on an orbit near the zenith, compared to when the satellite is in any position on an orbit besides near the zenith, the rate of change in an angle of each axis per Δt sec, which is the calculation cycle for controlling the antenna, greatly increases and the error of an obtained program command angle greatly increases. In order to avoid this, a technique for satellite tracking antenna drive control in Patent Literature 2 discloses a satellite tracking antenna drive control technique in which a program prediction angle for pointing to the satellite is calculated at predetermined intervals based on orbit prediction information of the satellite. Then, when the satellite is predicted to pass near the zenith based on the program prediction angle, X/Y coordinates are chosen as coordinates used in an interpolation process to calculate a program command angle pointing to the satellite at a time interval shorter than the time interval for this program prediction angle.

CITATION LIST

Patent Literature

Patent Literature 1: Unexamined Japanese Patent Application Kokai Publication No. H07-202541

Patent Literature 2: Unexamined Japanese Patent Application Kokai Publication No. 2001-237629

SUMMARY OF INVENTION

Technical Problem

As a technique for controlling the attitude of an antenna (ground antenna) of a satellite communication earth station, an azimuth-elevation (AZ/EL) mount is used for supporting rotation around a vertical axis (AZ axis) and a horizontal axis (EL axis). In a case where a target satellite is on a quasi-zenith orbit, which looks like a figure-eight orbit as viewed from the ground, and a ground antenna is located inside the loop of figure eight, the satellite tracking follows a closed curve surrounding the zenith. Thus, when the azimuth (AZ) axis and the elevation (EL) axis are driven for controlling attitude (beam direction) of the antenna, the rotation angle of the AZ axis is 360 degrees or more. In such a case, for antennas that are not capable of unlimited rotation, there is a need, for example, to perform the task of unwinding signal cable (cable rewinding) by rotating around the AZ axis in a direction opposite to the tracking direction, and interruption of communication during the rewinding is unavoidable.

An antenna using a three-axis mount including a vertical axis, a horizontal axis, and a cross horizontal axis being on the horizontal axis and orthogonal to the horizontal axis, also encounters the above-mentioned problems. Changes in the satellite orbit due to perturbation affect the positional change of the ground antenna between the inside and the outside of the figure eight in the quasi-zenith orbit, which requires control for both the situations.

As a technique for controlling the attitude of the ground antenna, there is an X/Y mount that supports rotation around an X-axis fixed horizontally to the ground and a Y-axis that is perpendicular to the X-axis in a horizontal plane. When the X/Y mount type is used, there is no need to rewind the cable even when the ground antenna is located inside a loop of the figure eight. However, the mechanical requirements, such as for the antenna to have a higher center of gravity, become more stringent.

The present disclosure is made to solve the problems described above, and an objective of the present disclosure is to track a target object on an orbit that is a closed curve surrounding the zenith even when a drive range of an antenna is restricted.

Solution to Problem

To achieve the above-mentioned objective, the antenna control device of the present disclosure controls a pointing direction of an antenna of an antenna apparatus to be driven by an azimuth-elevation mount. The azimuth-elevation mount includes a fixed base, a vertical axis perpendicular to a horizontal plane, the vertical axis being a rotation axis that rotates in relation to the base, a vertical axis driver to drive and rotate the vertical axis, an azimuth angle mount to be rotated and moved by the vertical axis; a horizontal axis being horizontal and being a rotation axis that rotates in relation to the azimuth angle mount; a horizontal axis driver to drive and rotate the horizontal axis, an elevation angle mount to be rotated and moved by the horizontal axis; a cross horizontal axis perpendicular to the horizontal axis, the cross horizontal axis being a rotation axis that rotates in relation to the elevation angle mount, a cross horizontal axis driver to drive and rotate the cross horizontal axis, and an antenna to be rotated and moved by the cross horizontal axis. A direction acquirer acquires a target direction in which a target object to be tracked by the antenna exists. A coordinate converter converts a target conversion direction of interest for conversion into an X-coordinate and a Y-coordinate in relation to a Y-axis horizontally fixed within a rotation range of the vertical axis, an X-axis vertically and horizontally fixed to the Y-axis, and a Z-axis perpendicular to the X-axis and the Y-axis, the X-coordinate being an angle between the Z-axis and a projection of the target conversion direction projected on a YZ-plane containing the Y-axis and the Z-axis, the Y-coordinate being an angle between the YZ-plane and the target conversion direction. A controller calculates a command value for the vertical axis driver for rotating the vertical axis within the rotation range so that a mount azimuth angle between the Y-axis and a direction perpendicular to the horizontal axis in the horizontal plane is an azimuth rotation angle that is an angle obtained by multiplying, by a coefficient, the Y-coordinate obtained through the conversion of the target direction by the coordinate converter, and to calculate a command value for each of the horizontal axis driver and the cross horizontal axis driver so that a difference between the pointing direction and the target direction is less than or equal to an allowable value.

Advantageous Effects of Invention

According to the present disclosure, a target object on an orbit that is a closed curve surrounding the zenith can be tracked even when a drive range of an antenna is restricted.

DESCRIPTION OF EMBODIMENTS

Hereinafter, a vertical axis, a horizontal axis, and a cross horizontal axis are referred to as an azimuth (AZ) axis, an elevation (EL) axis, and a cross-elevation (C-EL) axis, respectively. Likewise, an angle of the AZ axis, an angle of the EL axis, and an angle of the C-EL axis are referred to as an AZ angle, an EL angle, and a C-EL angle, respectively.

Embodiment 1

Figure 1:
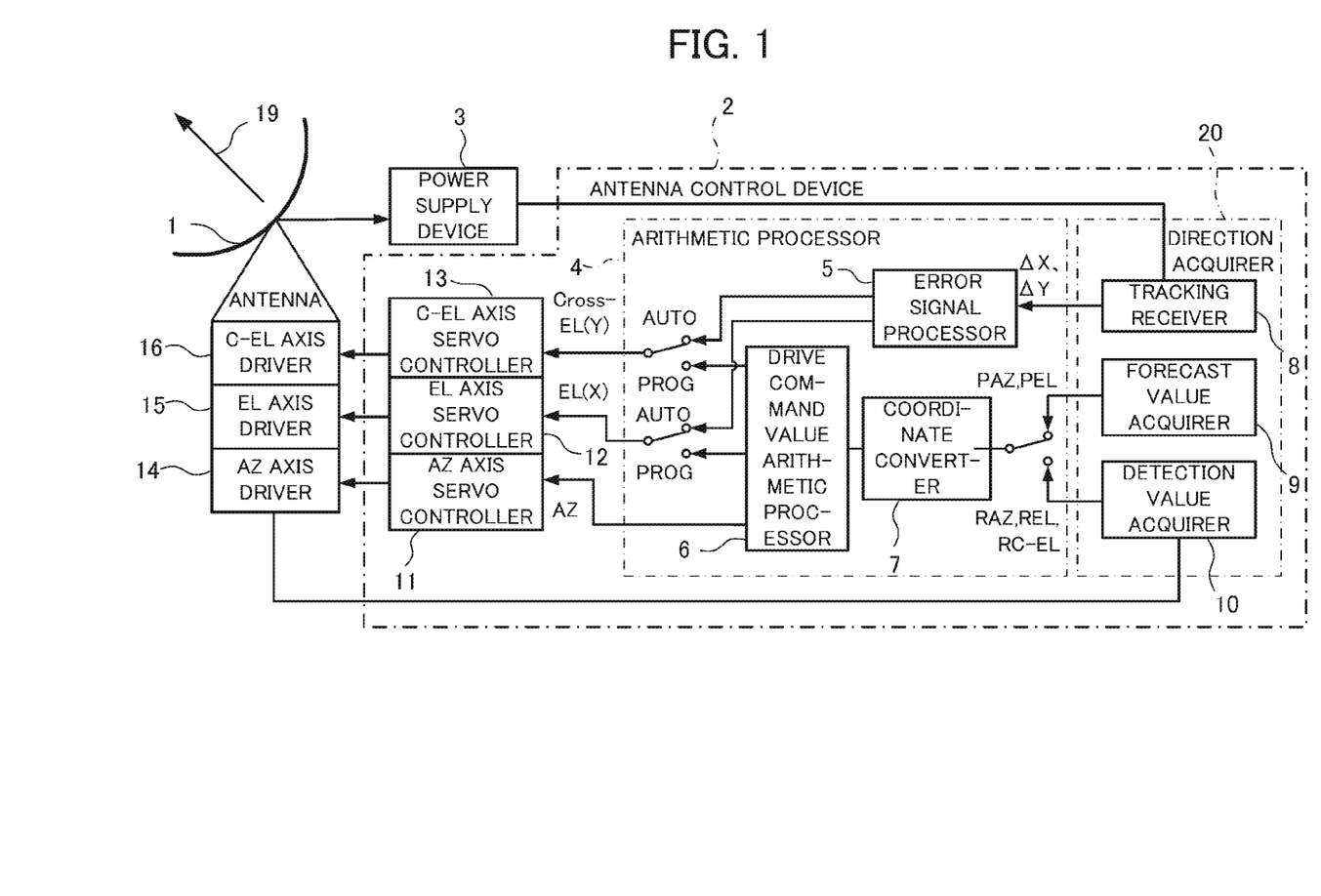
FIG. 1 is a block diagram illustrating a configuration example of an antenna control device and an antenna apparatus according to Embodiment 1 of the present disclosure.

FIG. 1 is a block diagram illustrating a configuration example of an antenna control device and an antenna apparatus according to Embodiment 1 of the present disclosure. An antenna control device 2 drives an antenna 1, which is a three-axis control antenna, around each axis to align a beam direction of the antenna 1 with a target based on a signal and the like from the target. The beam direction, that is, the direction in which the antenna 1 is oriented, is referred to as a pointing direction of the antenna. The antenna control device 2 includes an arithmetic processor 4, a tracking receiver 8, a forecast value acquirer 9, a detection value acquirer 10, and a servo controller for each axis. The servo controller includes a vertical axis (AZ axis) servo controller 11, a horizontal axis (EL axis) servo controller 12, and a cross horizontal axis (C-EL axis) servo controller 13, which are respectively associated with a vertical axis (AZ axis) driver 14, a horizontal axis (EL axis) driver 15, and a cross horizontal axis (C-EL axis) driver 16 for control of attitude of the antenna 1.

A power feeding device 3 generates a SUM signal and an ERR signal from a satellite-emitted signal received by the antenna 1, and transmits the SUM and ERR signals to the tracking receiver 8. The tracking receiver 8 performs demodulation and detection from the SUM and ERR signals and then outputs two-axis angle error signals ΔX and ΔY based on a phase difference and an amplitude ratio between the SUM signal and the ERR signal. The tracking receiver 8 is a receiver that generates two-axis angle error signals, which are angle error signals of the horizontal axis and the cross horizontal axis of the antenna 1, based on a signal emitted by the target satellite and then received by the antenna 1.

The forecast value acquirer 9 acquires a PAZ, which is an azimuth angle component, and PEL, which is an elevation angle component, of the direction where the satellite exists, defined by the orbit forecast value obtained from an unillustrated satellite control device or the like. The angles PAZ and PEL are also referred to as an orbit forecast value. Also, the detection value acquirer 10 obtains a detection value of an angle for each drive axis from a driver of each axis. The tracking receiver 8, the forecast value acquirer 9, and the detection value acquirer 10 constitute a direction acquirer 20 that acquires a target direction which is the direction in which the target object (satellite) to be tracked by the antenna exists. The tracking receiver 8, the forecast value acquirer 9, and the detection value acquirer 10 are not all necessarily required. The antenna control device 2 may include at least the tracking receiver 8 or the forecast value acquirer 9. In Embodiment 1, the detection value acquirer 10 is not necessary. The detection value acquirer 10 is used in Embodiment 2.

The arithmetic processor 4 of the antenna control device 2 calculates a drive command value of the antenna 1 based on the two-axis angle error signals ΔX and ΔY from the tracking receiver 8 and the orbit forecast values PAZ and PEL which are acquired by the forecast value acquirer 9. The arithmetic processor 4 includes an error signal processor 5, a drive command value arithmetic processor 6, and a coordinate converter 7. The error signal processor 5 converts the two-axis angle error signals ΔX and ΔY to be suitable for driving of the antenna 1. The coordinate converter 7 converts the orbit forecast values PAZ and PEL to a coordinate system that is suitable for calculating the drive command value. The drive command value arithmetic processor 6 is a controller that calculates a drive command value to align the beam direction with the target object while keeping the drive amount of each axis of the antenna within a restricted range.

As is described in Embodiment 2, the detection value of the angle of each drive axis that is acquired by the detection value acquirer 10 can also be input into the coordinate converter 7. In FIG. 1, a selector switch illustrated on the input side of the coordinate converter 7 indicates this input option.

Figure 2:
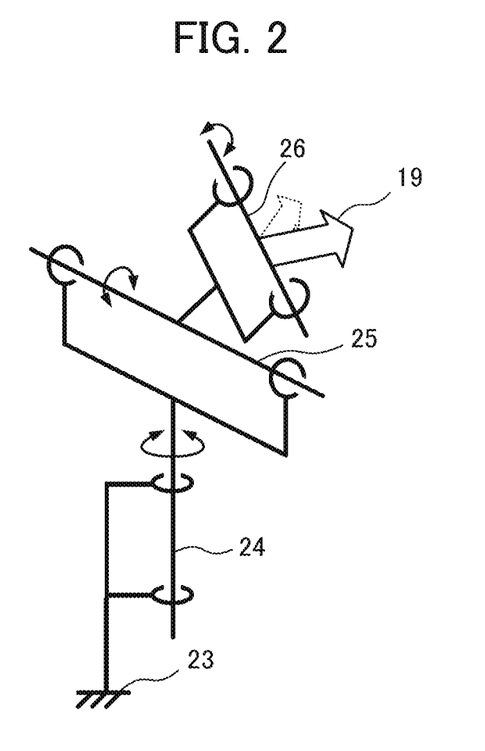
FIG. 2 is a conceptual diagram illustrating the mutual relationship between mounts of a three-axis control antenna that is the antenna apparatus according to the embodiment.

FIG. 2 is a conceptual diagram illustrating the mutual relationship between mounts of a three-axis control antenna that is the antenna apparatus according to the embodiment. The three-axis control antenna includes three axes: a vertical axis 24, a horizontal axis 25, and a cross horizontal axis 26. The vertical axis 24 is supported by a base 23, and is rotatable around a line perpendicular to the base 23. The vertical axis 24 has a function of azimuth angle tracking of the antenna 1 mainly. The horizontal axis rotates together with the vertical axis 24, and is rotatable approximately 180° such that the antenna 1 can be directed in any direction from one horizon up through the zenith to the opposite horizon. The horizontal axis 25 has a function of elevation angle tracking mainly.

The cross horizontal axis 26 rotates together with the horizontal axis 25, and is rotatable within a certain angle range around a straight line perpendicular to the horizontal axis 25. Normally, the rotation angle range of the cross horizontal axis 26 is smaller than the rotation angle range of the horizontal axis 25. The antenna 1 is fixed to the cross horizontal axis 26. The vertical axis 24, the horizontal axis 25, and the cross horizontal axis 26 enable a beam direction 19 of the antenna 1 to be oriented in any intended direction. The antenna control device 2 controls these axes to cause the beam direction of the antenna to track the target object.

The antenna apparatus is driven by an azimuth-elevation mount (AZ/EL mount). The antenna apparatus includes the base 23 fixed horizontally, the vertical axis 24 perpendicular to a horizontal plane, the vertical axis 24 being a rotation axis that rotates in relation to the base 23, the vertical axis driver 14 to drive and rotate the vertical axis 24, an azimuth angle mount to be rotated and moved by the vertical axis 24, the horizontal axis 25 being horizontal, and being a rotation axis that rotates in relation to the azimuth angle mount, the horizontal axis driver 15 to drive and rotate the horizontal axis 25, an elevation angle mount to be rotated and moved by the horizontal axis 25, the cross horizontal axis 26 perpendicular to the horizontal axis, the cross horizontal axis 26 being a rotation axis that rotates in relation to the elevation angle mount, the cross horizontal axis driver 16 to drive and rotate the cross horizontal axis 26, and the antenna 1 to be rotated and moved by the cross horizontal axis 26.

The azimuth angle mount faces the direction perpendicular to the horizontal axis 25 in the horizontal plane. An angle between the direction in which the azimuth angle mount faces and an azimuth reference direction, is referred to as a mount azimuth angle. The elevation angle mount faces the direction of an elevation angle mount normal which is normal to a plane containing a line parallel to the horizontal axis 25 and the cross horizontal axis 26. An angle between the elevation angle mount normal vector and the horizontal plane is referred to as a mount elevation angle. When the cross horizontal axis 26 does not rotate, the mount azimuth angle is the azimuth angle of the pointing direction of the antenna 1 whereas the mount elevation angle is the pointing direction of the antenna 1.

Figure 3:
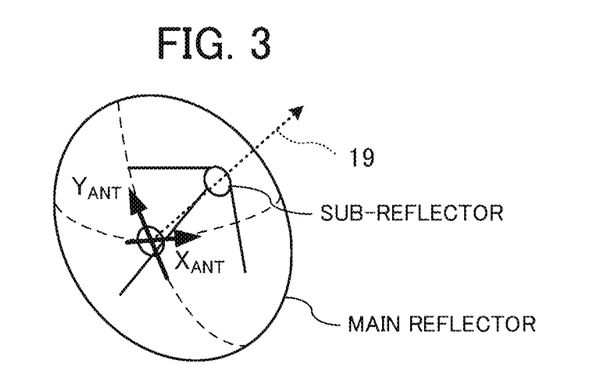
FIG. 3 is a conceptual diagram illustrating the mutual relationship between axes of the antenna.

FIG. 3 is a conceptual diagram illustrating the mutual relationship between axes of the antenna. As illustrated in FIG. 3, the $X_{ANT}$-$Y_{ANT}$ coordinate system is fixed to the main reflector. The $X_{ANT}$ axis corresponds to the EL axis whereas the $Y_{ANT}$ axis corresponds to the C-EL axis. The error signal processor 5 converts the two-axis angle error signals ΔX and ΔY, which are signals indicating the angle errors of $X_{ANT}$ axis and $Y_{ANT}$ axis, to be suitable for driving of the antenna, and outputs drive commands to the horizontal axis (EL axis) servo controller 12 and the cross horizontal axis (C-EL axis) servo controller 13 to drive the antenna 1. The error signal processor 5 is a controller that calculates the command values for each of the horizontal axis driver 15 and the cross horizontal axis driver 16 so that the difference between the pointing direction of the antenna 1 and the target direction is less than or equal to an allowable value.

As is described in Embodiment 3, the command values calculated by the drive command value arithmetic processor 6 can be used as the command values for the horizontal axis driver 15 and the cross horizontal axis driver 16. The two selector switches in FIG. 1 illustrated on the input side of the horizontal axis (EL axis) servo controller 12 and the cross horizontal axis (C-EL axis) servo controller 13 indicate such kind of usage.

Figure 4:
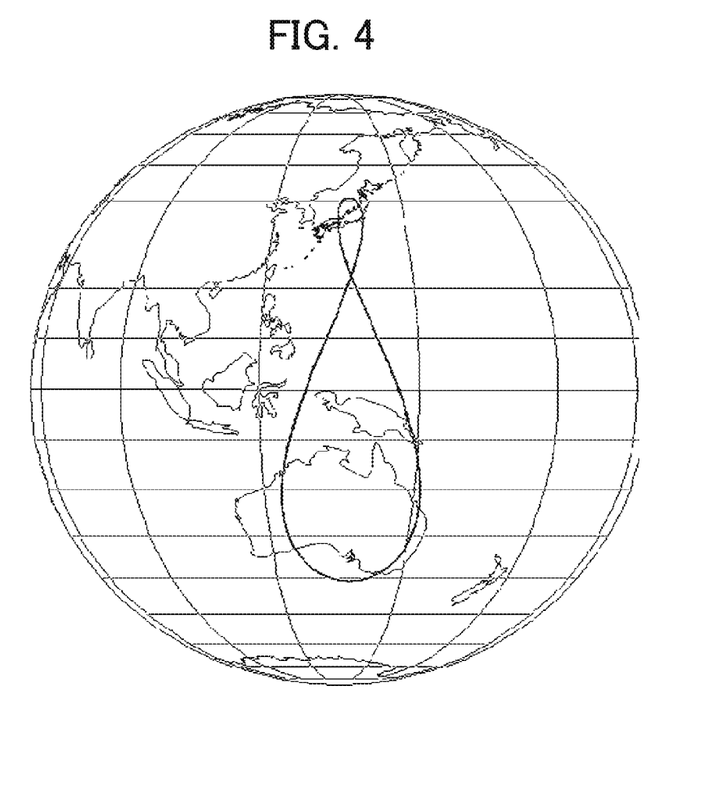
FIG. 4 is a diagram illustrating an example of an orbit of a satellite that is a target to be tracked.

The forecast value acquirer 9 acquires the orbit forecast values PAZ and PEL, which are prediction values of the satellite position, and then transmits the orbit prediction values PAZ and PEL to the coordinate converter 7. FIG. 4 is a diagram illustrating an example of an orbit of a satellite that is a target to be tracked. FIG. 4 illustrates an orbit of a quasi-zenith satellite, which is viewable from an observation point fixed to the surface of the earth, as a path representing the positions on the surface of the earth where the satellite is in the zenith direction. As viewed from an observation point fixed to the surface of the earth (for example an installation ground point of the antenna 1), the quasi-zenith satellite traces, for example, a figure-eight orbit that is long in the north-south direction.

After converting the AZ-EL coordinate system into an X-Y coordinate system for calculating the drive command value, the coordinate converter 7 transmits the X-Y coordinate system to the drive command value arithmetic processor 6. The drive command value arithmetic processor 6 calculates drive command values based on the input orbit forecast values and outputs the drive command values to the servo controller of each axis. An example of the process for the drive command value arithmetic processor 6 and the coordinate converter 7 is described below.

Figure 5:
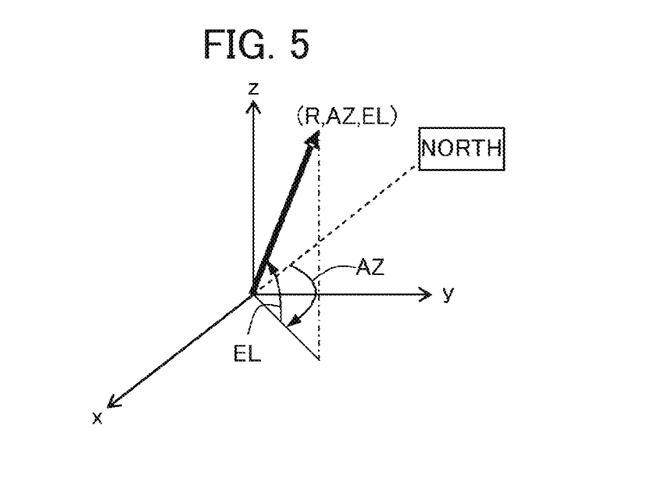
FIG. 5 is a diagram illustrating the relationship between coordinates of an AZ/EL mount and orthogonal coordinates.

FIG. 5 is a diagram illustrating the relationship between coordinates of the AZ/EL mount and orthogonal coordinates. A coordinate system having an origin corresponding to a point on the surface of the earth is considered. In the orthogonal coordinate system, the zenith direction perpendicular to the horizontal plane is taken as the z-axis, south in the horizontal plane is taken as the positive direction of the x-axis, east in the horizontal plane is taken as the positive direction of the y-axis. For the AZ/EL mount coordinates, that is the AZ-EL coordinate system, the AZ angle is measured clockwise as viewed from the zenith with north being AZ=0° as the azimuth reference direction, and the EL angle is the elevation angle from the horizontal plane. The azimuth of south is 180° (or −180°). The horizon is EL=0° whereas the zenith is EL=90°. With R denoting the radius vector of the AZ-EL coordinate system, the relationship between the orthogonal coordinate system (x, y, z) and the AZ-EL coordinate system (R, AZ, EL), which express the same point, is expressed by the following equations.

$$x = -R \cdot \cos EL \cdot \cos AZ \quad (1)$$

$$y = R \cdot \cos EL \cdot \sin AZ \quad (2)$$

$$z = R \cdot \sin EL \quad (3)$$

Figure 6:
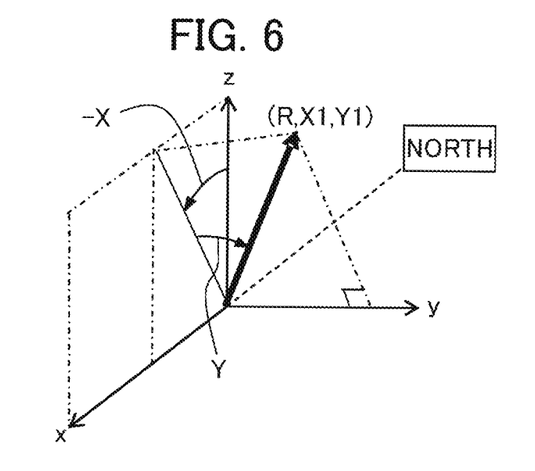
FIG. 6 is a diagram illustrating the relationship between coordinates of an X/Y mount and orthogonal coordinates.

FIG. 6 is a diagram illustrating the relationship between coordinates of an X/Y mount and orthogonal coordinates. The orthogonal coordinates are the same as in FIG. 5. For the X/Y mount coordinates, that is, the X-Y coordinate system, the zenith direction is the origin (0°) and the angle of rotation in the direction of north around the X-axis (y-axis of the orthogonal coordinates) fixed horizontally in the east-west direction is angle X. That is, the angle X is measured clockwise from the zenith when viewing the zenith direction from the east. Also, in a YZ-plane having a Y-axis (x-axis of the orthogonal coordinates) fixed horizontally in the north-south direction and Z-axis which is the zenith direction, the direction perpendicular to the angle X is the rotation axis and the angle of rotation in the direction of east is angle Y. The zenith direction is X=0° and Y=0°. The angle X is X=90° when facing north and is X=−90° when facing south. The angle Y is Y=90° when facing east and Y=−90° when facing west.

With R denoting the radius vector of the X-Y coordinate system, the relationship between the orthogonal coordinate system (x, y, z) and the X-Y coordinate system (R, X, Y), which express the same point, is expressed by the following equations.

$$x = -R \cdot \cos Y \cdot \sin X \quad (4)$$

$$y = R \cdot \sin Y \quad (5)$$

$$z = R \cdot \cos Y \cdot \cos X \quad (6)$$

The X-axis and Y-axis are both horizontal and are perpendicular to each other. The zenith direction perpendicular to the X-axis and the Y-axis is the Z-axis. An X-coordinate is an angle between the Z-axis and a projection of a target conversion direction, which is a direction of interest for conversion and projected on a YZ-plane including the Y-axis and the Z-axis. A Y-coordinate is an angle between the YZ-plane and the target conversion direction is a Y-coordinate.

Then, the AZ-EL coordinate system and the X-Y coordinate system can be converted mutually using the following conversion equations.

$$\tan AZ = \tan Y / \sin X \quad (7)$$

$$\sin EL = \cos X \cdot \cos Y \quad (8)$$

$$\tan X = \cos AZ / \tan EL \quad (9)$$

$$\sin Y = \sin AZ \cdot \cos EL \quad (10)$$

The coordinate converter 7 converts mutually between the AZ-EL coordinates or another coordinate system and the X-Y coordinates by using the above conversion equations.

Figure 7:
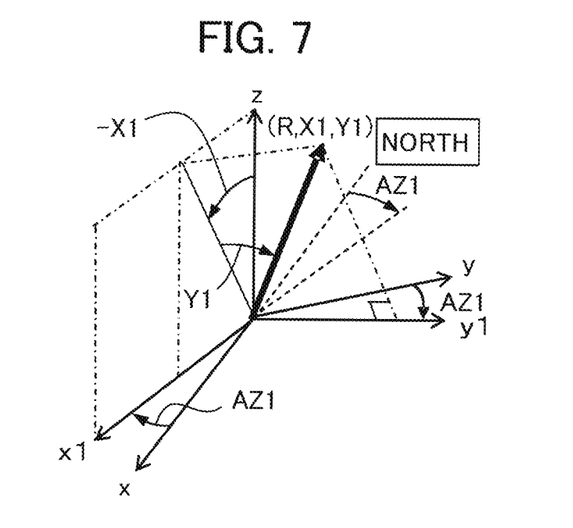
FIG. 7 is a diagram illustrating a rotation of a coordinate system assumed to calculate an AZ angle in the embodiment.

FIG. 7 is a diagram illustrating a rotation of a coordinate system assumed to calculate an AZ angle in the embodiment.

FIG. 7 illustrates the coordinate system being rotated clockwise around the AZ axis (z-axis) just by an angle AZ1 as viewed from the zenith toward the ground.

Consider the following conversion equations between the AZ-EL coordinates and the X1-Y1 coordinates when the X-Y coordinate system of the X/Y mount is rotated clockwise just by AZ1 around the AZ axis as viewed from the zenith toward the ground. Where the angle AZ is considered to be an angle (AZ−AZ1), the conversion equations are as follows:

$$\tan(AZ - AZ1) = \tan Y1 / \sin X1 \quad (11)$$

$$\sin EL = \cos X1 \cdot \cos Y1 \quad (12)$$

$$\tan X1 = \cos(AZ - AZ1) / \tan EL \quad (13)$$

$$\sin Y1 = \sin(AZ - AZ1) \cdot \cos EL \quad (14)$$

An azimuth-angle-changed target direction through rotation of the target direction around the AZ axis may be interpreted as being converted to the X-Y coordinates.

The angle AZ and the angle EL are expressed with the angle AZ1, the angle X1, and the angle Y1.

$$AZ = \tan^{-1}(\tan Y1 / \sin X1) + AZ1 \quad (15)$$

$$EL = \sin^{-1}(\cos X1 \cdot \cos Y1) \quad (16)$$

Also, the angle X and the angle Y1 are expressed with the angle AZ, the angle EL, and the angle AZ1.

$$X1 = \tan^{-1}(\cos(AZ - AZ1) / \tan EL) \quad (17)$$

$$Y1 = \sin^{-1}(\sin(AZ - AZ1) \cdot \cos EL) \quad (18)$$

Here, considering rotation around the AZ axis just by the angle AZ1, the angle X1 and the angle Y1 correspond to the command values of the rotation angles of the EL axis and the C-EL axis. The drive command value arithmetic processor 6 calculates drive command values X1 and Y1 according to the above conversion equations.

In the present embodiment, [a, b] represents a closed interval between a and b, and the rotation range of the AZ axis is [−180°, 180°]. That is, the rotation is not allowed outside the range between ±180° from the center of the rotation range. The center of the rotation range is AZ=0°, in other words, the north direction. Here, the rotation angle AZ1 of the AZ axis is equal to the value obtained by multiplying by coefficient −k, the Y-coordinate, which is a rotation angle in relation to the Y-axis fixed horizontally in the direction in the center of the rotation range of the AZ axis, that is AZ1=−kY. AZ1 is the azimuth rotation angle rotated around the AZ axis. Here, −k is used in order to reduce the rotation angle of the cross horizontal axis by rotating around the AZ axis since the rotation angle of the cross horizontal axis increases when a satellite exists in the south while tracking the satellite on a quasi-zenith orbit. The coefficient k may be changed by the value of the X-coordinate.

Since the Y-coordinate is the angle in relation to the plane containing the zenith direction and the Y-axis of the target direction of the antenna, the range of the Y-coordinate is [−90°, 90°]. The orbit that appears to go around on a closed curve surrounding the zenith is what leads to the antenna cable rewinding problem. In this case, given that the Y-coordinate reciprocates within a range included in [−90°, 90°], as long as the range is set to −1≤k≤1 (Condition 1), for example, the angle AZ1 does not exceed [−180°, 180°]. As long as the AZ1 is within the range of [−180°, 180°], the absolute value of k may be greater than 1.

Also, as for the drive command values X1 and Y1 in relation to the EL axis and the C-EL axis after rotating around the AZ axis just by the angle AZ1, when the rotatable range of the EL axis is [−Ex, Ex] and the rotatable range of the C-EL axis is [−Cx, Cx], the coefficient k is set to a value that satisfies the following Condition 2 and Condition 3. The angle X1 is a horizontal axis rotation angle which is an angle between the zenith direction and the elevation angle mount normal after rotation around the EL axis. The angle Y1 is a cross horizontal axis rotation angle which is an angle between the elevation angle mount normal vector and the pointing direction of the antenna after rotation around the C-EL axis.

When the rotatable range of the EL axis is [−90°, 90°] and the rotatable range of the C-EL axis is [−90°, 90°], as long as Condition 1 is satisfied, Condition 2 and Condition 3 are also satisfied.

To make $-Ex \leq X1 \leq Ex$ hold true, $$\tan X1 = \cos(AZ-AZ1)/\tan EL.$$

Given that the above tangent function, tan, is an odd function, therefore $$-\tan Ex \leq \cos(AZ-AZ1)/\tan EL \leq \tan Ex \qquad (19).$$

In AZ1=−kY, the following Condition 2 is obtained.

$$(1/Y)\cdot(\cos^{-1}(-\tan Ex \cdot \tan EL)-AZ) \leq k \leq (1/Y)(\cos^{-1}(\tan Ex \cdot \tan EL)-AZ) \qquad \text{Condition 2:}$$

When Y=0, the coefficient k is undefined, but in such a case, given that AZ=0, k is considered to be k=0.

To make $-Cx \leq Y1 \leq Cx$ hold true, $$\sin Y1 = \sin(AZ-AZ1)\cdot\cos EL.$$

Given that the above sine function, sin, is an odd function, therefore $$-\sin Cx \leq \sin(AZ-AZ1)\cdot\cos EL \leq \sin Cx \qquad (20).$$

In AZ1=−kY, the following Condition 3 is obtained.

$$(1/Y)\cdot(-\sin^{-1}(\sin Cx/\cos EL)-AZ) \leq k \leq (1/Y)\cdot(\sin^{-1}(\sin Cx/\cos EL)-AZ) \qquad \text{Condition 3:}$$

The coefficient k that satisfies Condition 1, Condition 2, and Condition 3 mentioned above so as to set the rotation angle of the AZ axis to AZ1=−kY is set. Thus, even when the target direction of the antenna goes around on the closed curve surrounding the zenith, the EL axis and the C-EL axis can be driven within the rotatable range without having to rewind the antenna. Thus, the rotation angle of the AZ axis may be decided provided that a coefficient k that satisfies Condition 1 to Condition 3 mentioned above from the rotatable range of the AZ axis, the EL axis, and the C-EL axis. If an orbit of the satellite to be tracked, for example, is specified as for a quasi-zenith satellite, and the installation area of the antenna on the surface of the earth can be limited, the direction in the center of the rotation range of the AZ axis can be limited to, for example, the north-south direction, and thus the coefficient k can be set to a maximum value at the installation of the antenna.

Figure 8:
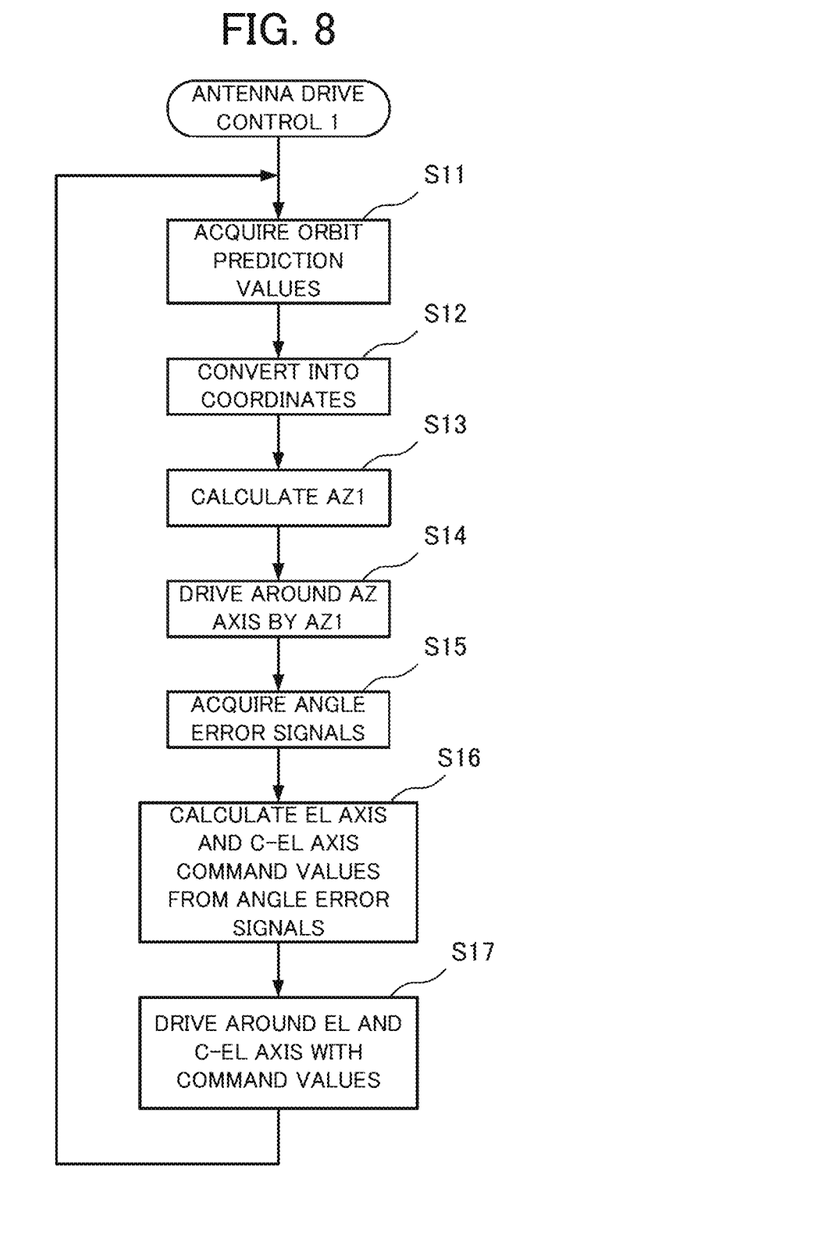
FIG. 8 is a flowchart illustrating an example of an operation of antenna drive control according to Embodiment 1.

FIG. 8 is a flowchart illustrating an example of an operation of antenna drive control according to Embodiment 1. The forecast value acquirer 9 acquires the orbit forecast values PAZ and PEL as the target direction (step S11). The coordinate converter 7 converts the orbit forecast values PAZ and PEL into X-Y coordinate values of the X/Y mount (step S12). The drive command value arithmetic processor 6 calculates an AZ axis drive amount AZ1=−kY from the X-Y coordinate values using a predetermined coefficient k so as to satisfy the above-described conditions (step S13). Then, driving around the AZ axis by the rotation angle AZ1=−kY is performed (step S14).

At this point in time, an angle error occurs between the target object and the beam direction of the antenna caused by the driving of the AZ axis. When this occurs, the error signal processor 5 acquires the angle error signals ΔX and ΔY from the tracking receiver 8 (step S15). The direction obtained by adding the angle error signals ΔX and ΔY to the pointing direction of the antenna 1 at that particular point is the target direction. The error signal processor 5 calculates the EL axis and C-EL axis command values (step S16) so that the two-axis angle error signals ΔX and ΔY become smaller, and then driving around the EL axis and the C-EL axis with the command values is performed (step S17). Returning to step S11 in the process, the arithmetic processor 4 repeats the above-described process from the next acquiring of an orbit forecast value.

In the description given for Embodiment 1, the direction in the center of the rotation range of the AZ axis and the Y-axis are placed in the north. The direction in the center of the rotation range of the AZ axis, and/or the Y-axis need not face north. Regardless of the direction in which the center of the rotation range of the AZ axis is installed, the conversion equations and the Conditions 1 to 3 may be calculated with the Y-axis within the rotation range of the AZ axis and with the X-axis taken as the direction perpendicular to the Y-axis in the horizontal plane. Also, the rotation angle AZ1 from the Y-axis equals a value of the Y-coordinate multiplied by the coefficient −k.

In the case that the target to be tracked by the antenna 1 is a quasi-zenith satellite, the orbit is longer in the north-south direction and shorter in the east-west direction, as illustrated in FIG. 4. In the case of tracking a quasi-zenith satellite, if the center of the rotation range of the AZ axis is installed in the north or the south and the Y-axis is taken in the north-south direction, the rotation angle of the AZ axis can be made smaller.

Embodiment 2

A configuration of the antenna control device according to Embodiment 2 is the same as the configuration of the antenna control device according to Embodiment 1 but a detection angle RAZ of the AZ axis, an detection angle REL of the EL axis, and a detection angle RC-EL of the C-EL axis, of the antenna 1, are used as inputs of the drive command value arithmetic processor 6 in the arithmetic processor 4. The coordinate converter 7 receives the detection angles RAZ, REL, and RC-EL from the detection value acquirer 10 and performs coordinate conversion. This means that the switch located between the coordinate converter 7 and the forecast value acquirer 9 and the detection value acquirer 10 of the antenna control device 2 in FIG. 1 is set to the side of the detection value acquirer 9.

In such a case, the X-Y coordinate values can be calculated since the beam direction of the antenna is unique even if the detection angle RC-EL of the C-EL axis is not 0°. Substituting AZ1=RAZ, X1=REL, and Y1=RC-EL into the previously-described equations (15) and (16) yields the azimuth angle component AZ and the elevation angle component EL of the pointing direction of the antenna 1 at that particular point in time. Then the AZ-EL coordinates are converted to X-Y coordinates. The drive command value arithmetic processor 6 can calculate the rotation angle of the AZ axis from the X-Y coordinate values obtained through conversion, by using the coefficient k. The arithmetic processor 4 performs driving around the EL axis and the C-EL axis based on the two-axis angle error signals ΔX and ΔY from the tracking receiver 8. The result from driving the EL axis and the C-EL axis is reflected to the REL and the RC-EL, and accordingly the feedback is provided for driving the AZ axis. The same advantageous effects in Embodiment 1 are obtained by calculating the drive command value with this feedback loop. In Embodiment 2, the antenna 1 can capture the target object with good accuracy, and the direction that is determined from the detection angles of the vertical axis, the horizontal axis and the cross horizontal axis of the antenna 1 at various points is regarded as the target direction to obtain the rotation angle of the vertical axis. The target direction is generated by using the detection angles of the vertical axis, the horizontal axis, and the cross horizontal axis of the antenna 1.

Figure 9:
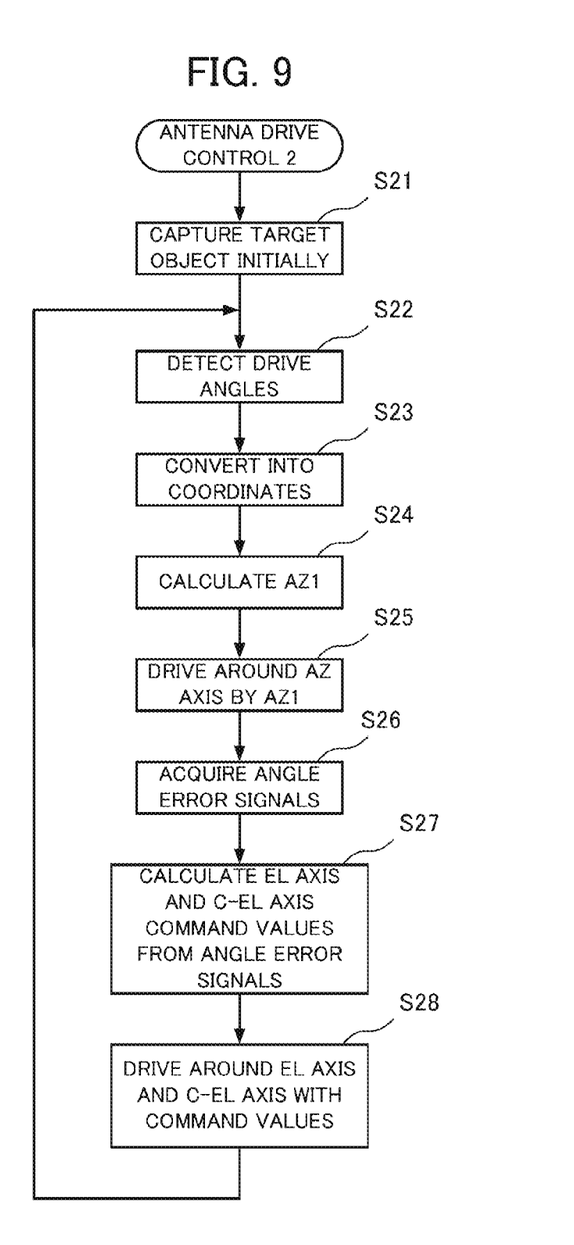
FIG. 9 is a flowchart illustrating an example of an operation of antenna drive control according to Embodiment 2 of the present disclosure.

FIG. 9 is a flowchart illustrating an example of an operation of antenna drive control according to Embodiment 2 of the present disclosure. After initial capture of the target object to being tracked (step S21), the detection value acquirer 10 acquires the detection angles RAZ, REL and RC-EL (step S22). The coordinate converter 7 converts the RAZ, REL and RC-EL into X-Y coordinate values of the X/Y mount (step S23). The drive command value arithmetic processor 6 calculates the AZ axis drive amount AZ1=−kY from the X-Y coordinate values obtained through conversion using the predetermined coefficient k in order so as to satisfy the above-described conditions (step S24). Then, driving around the AZ axis by AZ1=−kY is performed (step S25).

At this point in time, an angle error occurs between the target object and the beam direction of the antenna caused by the driving of the AZ axis. When this occurs, the error signal processor 5 acquires the two-axis angle error signals ΔX and ΔY from the tracking receiver 8 (step S26). The error signal processor 5 calculates the EL axis and the C-EL axis command values (step S27) so that the two-axis angle error signals ΔX and ΔY become smaller, and performs driving around the EL axis and the C-EL axis with the command values (step S28). Returning to step S22 in the process, the arithmetic processor 4 repeats the above-described process from the next acquiring of detection values.

As described above, in Embodiment 2, the acquisition of the orbit forecast value externally can be obviated. In Embodiment 2, the forecast value acquirer 9 is unnecessary.

Embodiment 3

The configuration of an antenna control device according to Embodiment 3 is the same as the configuration of the antenna control device according to Embodiment 1, but uses a program tracking (PROG) mode, in which the antenna 1 is controlled based on the orbit forecast value, of two operation modes of the antenna control device 2 in the present embodiment. In such a case, the beam direction 19 of the antenna 1 is aligned with the direction of the orbit forecast value obtained from the forecast value acquirer 9 without use of any signal from the target object.

In Embodiment 1 or Embodiment 2, an auto-tracking (AUTO) mode for controlling the attitude of the antenna 1 based on the signal from the target object is used. In other words, the two-axis angle error signals that are output by the tracking receiver 8 are processed by the error signal processor 5 and the C-EL axis and the EL axis are driven so that the angle errors become smaller. Also, in Embodiment 2, the AZ axis is driven based on the detection angle of the antenna. In contrast to this, in the PROG mode according to Embodiment 3, the command values (X1, Y1) of the EL axis and the C-EL axis are calculated from the forecast values PAZ and PEL.

The coordinate converter 7 converts the orbit forecast values PAZ and PEL acquired by the forecast value acquirer 9 into X-Y coordinate values. The drive command value arithmetic processor 6 calculates the rotation angle AZ1 of the AZ axis from the X-Y coordinate values obtained through conversion, and at the same time, calculates the command values X1 and Y1 of the EL axis and the C-EL axis, from the X-Y coordinate values. Then, the AZ axis, the EL axis, and the C-EL axis are driven by the command values AZ1, X1, and Y1. In Embodiment 3, the switch between the horizontal axis servo controller 12 and both the error signal processor 5 and the drive command value arithmetic processor 6 and the switch between the cross horizontal axis servo controller 13 and both the error signal processor 5 and the drive command value arithmetic processor 6 of the antenna control device 2 in FIG. 1 are set to the PROG side.

Figure 10:
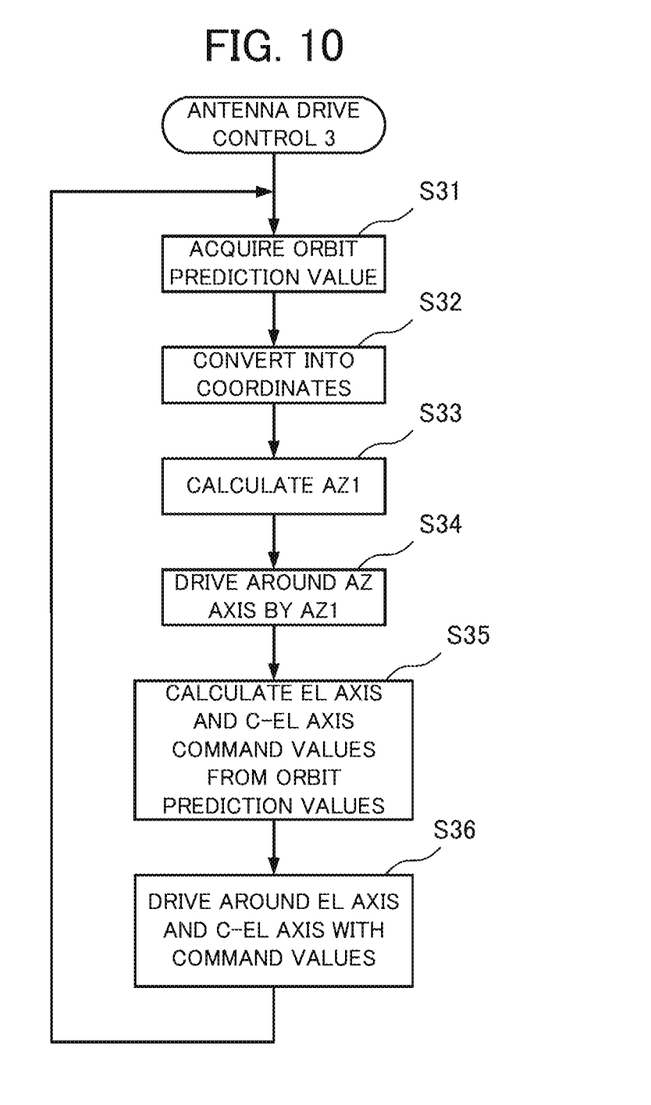
FIG. 10 is a flowchart illustrating an example of an operation of antenna drive control according to Embodiment 3 of the present disclosure.

FIG. 10 is a flowchart illustrating an example of an operation of antenna drive control according to Embodiment 3 of the present disclosure. The operations from the acquisition of the orbit forecast value in step S31 to the driving of the AZ axis by AZ1 in step S34 are the same as in step S11 to step S14 in FIG. 8. In Embodiment 3, the command values of the EL axis and the C-EL axis are calculated from the orbit forecast value (step S35) instead of the two-axis angle error signals, and the EL axis and the C-EL axis are driven by the command values (step S36). Returning to step S31 in the process, the arithmetic processor 4 repeats the above-described process from the next acquiring of an orbit forecast value.

The antenna control device 2 according to Embodiment 3 obtains the same advantageous effects as in Embodiment 1 by calculating the drive command values of the AZ axis, the EL axis and the C-EL axis based on the orbit forecast values. In Embodiment 3, the tracking receiver 8 and the error signal processor 5 are optional.

Specific Examples

Figure 11:
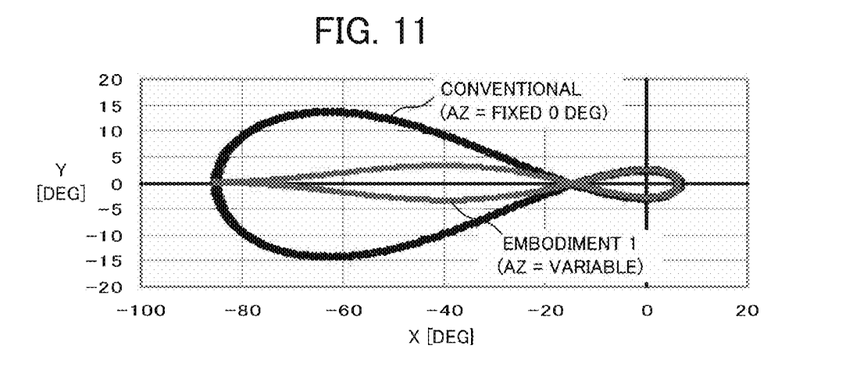
FIG. 11 is diagram illustrating an example of movement of an EL axis and a C-EL axis, which is obtained in Embodiment 1 and in a case where an AZ axis is fixed.

FIG. 11 is a diagram illustrating an example of movement of the EL axis and the C-EL axis, which is obtained in Embodiment 1 and in a case where the AZ axis is fixed. The horizontal axis is the angle (X) of the EL axis, whereas the vertical axis is the angle (Y) of the C-EL axis. FIG. 11 illustrates specific examples where the antenna apparatus has an AZ axis fixed at 0° and where the antenna apparatus has the configuration in Embodiment 1. In both specific examples, the antenna apparatus is tracking a satellite on a quasi-zenith orbit, and has a ground antenna installation location within the figure eight of the quasi-zenith satellite orbit, wherein the quasi-zenith orbit of the satellite appears as a closed curve surrounding the zenith. FIG. 11 illustrates, as an example, the changes in the EL angle (angle X) and the C-EL angle (angle Y) obtained when the drive range of the C-EL axis is [−10°, 10°].

When the AZ axis is fixed at 0° as is the conventional practice, the antenna cannot cope with an absolute value of the C-EL angle (angle Y) exceeding 10° since this exceeds the drive range of the antenna. However, when the AZ1=−kY (k=1) as in Embodiment 1, the C-EL angle (angle Y) changes are kept within the range of [−10°, 10° ].

Figure 12:
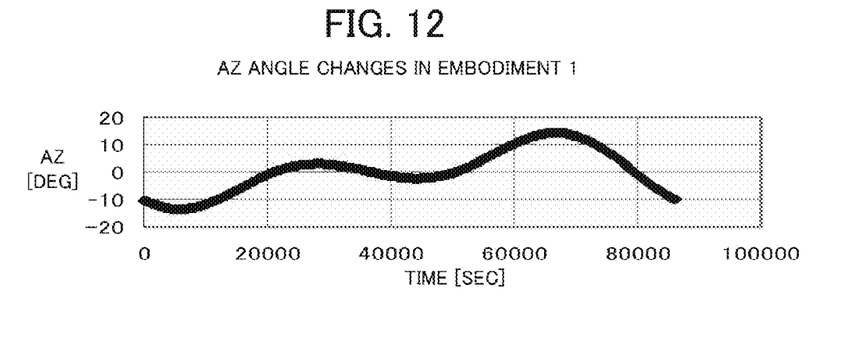
FIG. 12 is a diagram illustrating changes in an AZ angle in a specific example of Embodiment 1.
Figure 13:
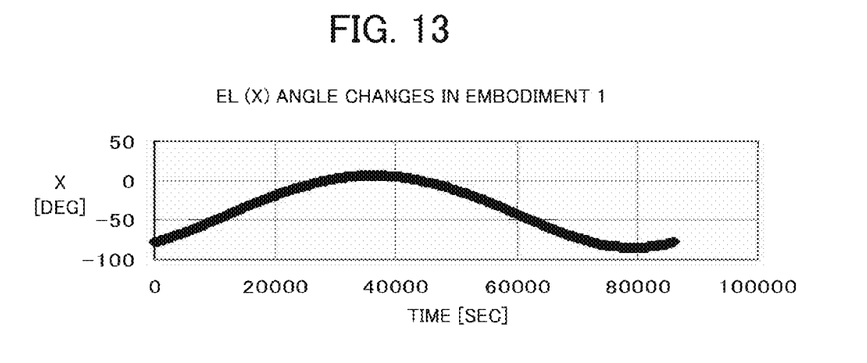
FIG. 13 is a diagram illustrating changes in an EL angle in the specific example of Embodiment 1.
Figure 14:
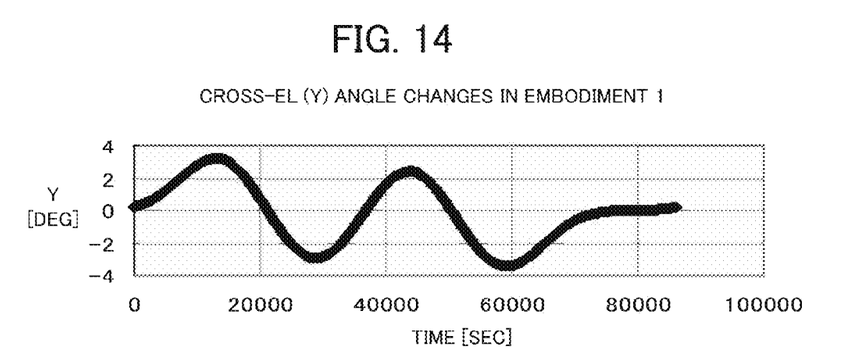
FIG. 14 is a diagram illustrating changes in a C-EL angle in the specific example of Embodiment 1.

FIG. 12 is a diagram illustrating changes in the AZ angle in a specific example of Embodiment 1. FIG. 13 is a diagram illustrating changes in an EL angle in the specific example of Embodiment 1. FIG. 14 is a diagram illustrating changes in the C-EL angle in the specific example of Embodiment 1. Each of these figures illustrates the specific example of Embodiment 1 in FIG. 11. The horizontal axis represents time (unit: second), whereas the vertical axis represents the detection angle (unit: degree) of each axis of the antenna. The changing of the AZ axis is kept within the range of [−20°, 20°], and thus clearly the task of rewinding is unnecessary.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2014-6482, filed on Jan. 17, 2014, including the specification, claims, drawings and abstract, the entire disclosure of which is incorporated herein by reference.

REFERENCE SIGNS LIST

1 Antenna
2 Antenna control device
3 Power feeding device
4 Arithmetic processor
5 Error signal processor (controller)
6 Drive command value arithmetic processor (controller)
7 Coordinate converter
8 Tracking receiver (receiver)
9 Forecast value acquirer
10 Detection value acquirer
11 Vertical axis (AZ axis) servo controller
12 Horizontal axis (EL axis) servo controller
13 Cross horizontal axis (C-EL axis) servo controller
14 Vertical axis (AZ axis) driver
15 Horizontal axis (EL axis) driver
16 Cross horizontal axis (C-EL axis) driver
19 Beam direction
20 Direction acquirer
23 Base
24 Vertical axis
25 Horizontal axis
26 Cross horizontal axis

The invention claimed is:

1. An antenna control device for controlling a pointing direction of an antenna of an antenna apparatus to be driven by an azimuth-elevation mount, the azimuth-elevation mount including:
a fixed base;
a vertical axis perpendicular to a horizontal plane, the vertical axis being a rotation axis that rotates in relation to the base;
a vertical axis driver to drive and rotate the vertical axis;
an azimuth angle mount to be rotated and moved by the vertical axis;
a horizontal axis being horizontal and being a rotation axis that rotates in relation to the azimuth angle mount;
a horizontal axis driver to drive and rotate the horizontal axis;
an elevation angle mount to be rotated and moved by the horizontal axis;
a cross horizontal axis perpendicular to the horizontal axis, the cross horizontal axis being a rotation axis that rotates in relation to the elevation angle mount;
a cross horizontal axis driver to drive and rotate the cross horizontal axis; and
an antenna to be rotated and moved by the cross horizontal axis;
the antenna control device comprising:
a direction acquirer to acquire a target direction in which a target object to be tracked by the antenna exists;
a coordinate converter to convert a target conversion direction of interest for conversion into an X-coordinate and a Y-coordinate in relation to a Y-axis horizontally fixed within a rotation range of the vertical axis, an X-axis vertically fixed to the Y-axis and horizontally, and a Z-axis perpendicular to the X-axis and the Y-axis, the X-coordinate being an angle between the Z-axis and a projection of the target conversion direction projected on a YZ-plane containing the Y-axis and the Z-axis, the Y-coordinate being an angle between the YZ-plane and the target conversion direction; and
a controller to calculate a command value for the vertical axis driver for rotating the vertical axis within the rotation range so that a mount azimuth angle between the Y-axis and a direction perpendicular to the horizontal axis in the horizontal plane is an azimuth rotation angle that is an angle obtained by multiplying, by a coefficient, the Y-coordinate obtained through the conversion of the target direction by the coordinate converter, and to calculate a command value for each of the horizontal axis driver and the cross horizontal axis driver so that a difference between the pointing direction and the target direction is less than or equal to an allowable value.

2. The antenna control device according claim 1, wherein the coefficient is determined such that when the mount azimuth angle is the azimuth rotation angle, the angle of the horizontal axis and the angle of the cross horizontal axis based on the target direction are within the rotatable range of the horizontal axis and the cross horizontal axis, respectively.

3. The antenna control device according to claim 1, wherein the Y-axis is placed at a center of a rotation range of the vertical axis.

4. The antenna control device according to claim 1, wherein
the direction acquirer comprises an orbit forecast acquirer to acquire an orbit forecast value of the target object, and a receiver to generate from a signal emitted by the target object and then received by the antenna, a two-axis angle error signal being an angle error signal of the horizontal axis and the cross horizontal axis of the antenna, the direction acquirer generating the target direction by using the orbit forecast value, and
the controller calculates from the two-axis angle error signal, a command value for each of the horizontal axis and the cross horizontal axis.

5. The antenna control device according to claim 1, wherein
the direction acquirer comprises a detector to acquire a detection angle of each of the vertical axis, the horizontal axis, and the cross horizontal axis, and a receiver to generate a two-axis angle error signal that is an angle error signal of the horizontal axis and the cross horizontal axis of the antenna from a signal emitted by the target object and then received by the antenna, the direction acquirer generating the target direction by using the detection angle of each of the vertical axis, the horizontal axis, and the cross horizontal axis, and the controller calculates a command value for each of the horizontal axis and the cross horizontal axis from the two-axis angle error signal.

6. The antenna control device according to claim 1, wherein the direction acquirer comprises an orbit forecast acquirer to acquire an orbit forecast value of the target object as the target direction, and the controller calculates the command value for each of the horizontal axis and the cross horizontal axis, based on the X-coordinate and the Y-coordinate obtained through the conversion an azimuth-angle changed target direction by the coordinate converter, the azimuth-angle changed target direction being a direction obtained after rotation of the target direction around the vertical axis by the azimuth rotation angle.

7. The antenna control device according to claim 1, wherein the target object is a quasi-zenith satellite, and a center of a rotation range of the vertical axis is in north or south, and the Y-axis is a north-south direction.

8. An antenna apparatus comprising:

a fixed base;

a vertical axis perpendicular to a horizontal plane, the vertical axis being a rotation axis that rotates in relation to the base;

a vertical axis driver to drive and rotate the vertical axis;

an azimuth angle mount to be rotated and moved by the vertical axis;

a horizontal axis being horizontal and being a rotation axis that rotates in relation to the azimuth angle mount;

a horizontal axis driver to drive and rotate the horizontal axis;

an elevation angle mount to be rotated and moved by the horizontal axis;

a cross horizontal axis perpendicular to the horizontal axis, the cross horizontal axis being a rotation axis that rotates in relation to the elevation angle mount;

a cross horizontal axis driver to drive and rotate the cross horizontal axis;

an antenna to be rotated and moved by the cross horizontal axis; and the antenna control device to control a pointing direction of the antenna, according to claim 1.

* * * * *